US009282021B2

United States Patent
Smith et al.

(10) Patent No.: US 9,282,021 B2
(45) Date of Patent: Mar. 8, 2016

(54) METHOD AND APPARATUS FOR SIMULATED FAILOVER TESTING

(71) Applicant: Oracle International Corporation, Redwood City, CA (US)

(72) Inventors: Jeffrey Anderson Smith, Hutto, TX (US); Piyush Shivam, Austin, TX (US); William Eugene Baker, Austin, TX (US)

(73) Assignee: Oracle International Corporation, Redwood City, CA (US)

( * ) Notice: Subject to any disclaimer, the term of this patent is extended or adjusted under 35 U.S.C. 154(b) by 719 days.

(21) Appl. No.: 13/655,857

(22) Filed: Oct. 19, 2012

(65) Prior Publication Data

US 2014/0114644 A1 Apr. 24, 2014

(51) Int. Cl.

| G06F 9/44 | (2006.01) |
|---|---|
| G06F 13/10 | (2006.01) |
| G06F 13/12 | (2006.01) |
| H04L 12/26 | (2006.01) |
| H04L 29/08 | (2006.01) |
| H04L 29/06 | (2006.01) |
| H04L 12/24 | (2006.01) |
| G06F 11/26 | (2006.01) |
| G06F 11/07 | (2006.01) |
| G06F 3/06 | (2006.01) |

(52) U.S. Cl.
CPC .............. *H04L 43/50* (2013.01); *H04L 41/145* (2013.01); *H04L 67/1097* (2013.01); *H04L 67/38* (2013.01); *G06F 3/067* (2013.01); *G06F 11/0727* (2013.01); *G06F 11/261* (2013.01)

(58) Field of Classification Search
CPC ... H04L 41/145; H04L 43/50; H04L 67/1097; H04L 67/38; G06F 11/0727; G06F 11/261; G06F 3/067
USPC ............................................... 703/21
See application file for complete search history.

(56) References Cited

U.S. PATENT DOCUMENTS

| 8,627,005 B1 * | 1/2014 | Glade et al. .................... 711/114 |
|---|---|---|
| 8,938,477 B1 * | 1/2015 | Tang et al. ..................... 707/803 |
| 2008/0021693 A1 * | 1/2008 | Campbell et al. ............... 703/21 |

* cited by examiner

*Primary Examiner* — Aniss Chad
(74) *Attorney, Agent, or Firm* — Polsinelli PC

(57) ABSTRACT

Implementations of the present disclosure involve a system and method for simulating a storage cluster testing system. The method and system includes a processor configured to instructions stored on a memory to produce a simulation interface. The simulation interface includes an abstraction layer that receives verbs from a test driver and passes the verbs to one of two or more plugins. The plugins may include a synthetic plugin configured to translate the verbs into one or more command and send commands to a simulated storage appliance that is a computing device with relatively lower performance than an actual storage appliance. The simulated storage appliance may act in place of two storage appliances clustered to form a storage cluster. The simulated storage appliance forms a simulated storage cluster. The simulated storage cluster simulates the performance of the verb on by the storage cluster.

27 Claims, 8 Drawing Sheets

METHOD AND APPARATUS FOR SIMULATED FAILOVER TESTING

TECHNICAL FIELD

Aspects of the present disclosure relate to network file systems utilizing storage appliances, and particularly storage appliances running the NFS file system protocol. More particularly, aspects of the present disclosure involve an apparatus and method for simulating a cluster of storage appliances and running conventional tests on the simulated cluster.

BACKGROUND

As the number of computing devices increase across society, electronic data management has become increasingly challenging. Modern devices create and use ever increasing amounts of electronic data ranging from digital photos and videos, to large data sets related to any number of topics including energy exploration, human resources, seismic activity, and gene research. This explosion in digital data has naturally led to ever increasingly large amounts of data that must be stored. Correspondingly, the data storage field is under constant pressure to increase size, performance, accessibility, reliability, security, and efficiency of data storage systems.

In order to meet this demand for data storage, various storage systems have been developed. Large scale storage systems often include storage appliances that include arrays of spinning hard drives, magnetic tape drives, and solid state drives. Multiple storage appliances may be networked together to form a cluster. A cluster of storage appliances allows for adding capacity as well as added redundancy. Storage appliances in a cluster may be configured to mirror data so that if one of the storage appliances becomes inoperable for any reason, the data is still available at another location.

Referring to FIG. 1, a storage network 100 is depicted. This storage network 100 includes one or more storage appliances 110, 120 each including one or more disk drives. The storage network 100 is accessible by clients 130, 132, 134, 136 using a network 140. Generally speaking, the storage appliance (or appliances) manages the storage of data on disk drives. The depicted networks may be local in nature or geographically dispersed such as with large private enterprise networks or the Internet.

The storage appliances 110, 120 may include any conventional storage appliance such as a ZFS storage appliance. ZFS is a combined file system and volume manager designed by Sun Microsystems® in 2005 that allows for data integrity verification and repair, high storage capacities, along with numerous other features. ZFS based systems utilize storage pools (often referred to as zpools) constructed of virtual devices (often referred to as vdevs) constructed of block devices. A block device is any device that moves data in the form of blocks including hard disk drives and flash drives. A virtual device may span a number of block devices and a zpool may include one or more vdevs, each including one or more partitions of hard drives or one or more hard drives.

Traffic to and from the storage appliances 110, 120 is typically managed by the one or more dedicated storage servers located within the appliances. A common protocol used for managing these storage appliances 110, 120 is the network file system, commonly abbreviated "NFS." NFS is a widely used distributed file system protocol, originally developed by Sun Microsystems in 1984, and currently in version 4 (NFSv4). NFS allows users at the clients 130-136 to access the stored data seamlessly by providing a programming interface found on the storage appliances 110, 120. The programming interface enables the creation and deletion of files, reading and writing of files, performing seeks within a file, creating and deleting directories, managing directory contents, and any other file operation. The operating system running on each of the clients 130-136 is configured to utilize the programming interface in order to manage the file system and to facilitate the interaction of executing applications with data residing in the storage appliances 110, 120.

In this example, the storage appliances 110, 120 are configured to operate using NFSv4. Generally, NFS systems are configured to separate the storage of file-system metadata and the files themselves. The metadata describes the location of the files on the storage appliances' disk drives that the clients 130-136 are attempting to access. NFS is a "stateful" protocol meaning the storage appliances 110, 120 each maintain a log of current operations being performed by the clients 130-136. This log is often referred to as "state table."

Each storage appliance 110, 120 is aware of the pools that are being served by each storage appliance 110, 120. Each pool has a corresponding distributed stable storage (DSS) path where the storage server writes persistent data about each client 130-136 when the client first contacts the server. This data may be used to identify data owned by a client if the client becomes disconnected from the storage server or storage appliances 110, 120.

Two or more storage appliances 110, 120 may be connected to form a cluster. It is common to refer to each storage appliance 110, 120 as a "node." Each of the nodes exports different resources, pools and interfaces to the clients 130-136. If one of the nodes in the cluster encounters a problem and is not longer capable of maintaining operations, the operations of the failing node (the storage server portion of the node) may failover or be taken over by one or more other nodes. In other words, during a failover or takeover, one of the storage appliances transfers its responsibilities for managing its various resources, pools, and interfaces to one of the other storage appliances. Generally speaking, the storage server of the other storage server takes over for the storage server, with the other storage server interacting with the clients and the storage of the storage server. A failover or takeover is generally triggered when one of the nodes reboots or panics. A failback is the opposite of a failover/takeover. When a failback occurs, a node has been brought back online and the pools and interfaces that were taken over by the peer node are transferred back to the node that originally was in charge of them. The ability to perform failovers/takeovers and failbacks is a feature of having multiple storage appliances 110, 120 arranged in a cluster, increasing the uptime of a system.

In order to perform unit and regression testing for changes to the software running on the storage appliances 110, 120, a cluster 100 may be required. For example, in order to test the performance of a failover/takeover and failback multiple storage appliances 110, 120 configured in a cluster 100 are necessary. One or more of the clients 130-136 may be configured as a testing workstation capable of connecting to the cluster 100, directly to one or more of the storage appliances 110, 120 in order to perform tests various tests of the system.

These clusters of storage appliances are very expensive, with each node costing in the thousands, tens of thousands, or hundreds of thousands of dollars. Since simply installing extra clusters for testing is cost prohibitive, securing time to unit and regression test features requiring a cluster can be difficult.

Several traditional virtualization solutions of storage appliances are available and work well, but nonetheless suffer from some drawbacks. Current commercial solutions tend to require large amounts of computing resources in order to operate and using them to simulate the special-purpose hardware of storage appliances is often not possible or very difficult, requiring the building of special purpose drivers and other time consuming customizations.

It is with these and other issues in mind that various aspects of the present disclosure were developed.

SUMMARY

Implementations of the present disclosure involve a system and method for simulating a storage cluster testing system. The method and system includes a processor configured to instructions stored on a memory to produce a simulation interface. The simulation interface includes an abstraction layer that receives verbs from a test driver and passes the verbs to one of two or more plugins. The plugins may include a synthetic plugin configured to translate the verbs into one or more command and send commands to a simulated storage appliance that is a computing device with relatively lower performance than an actual storage appliance. The simulated storage appliance may act in place of two storage appliances clustered to form a storage cluster. The simulated storage appliance forms a simulated storage cluster. The simulated storage cluster simulates the performance of the verb on by the storage cluster.

DETAILED DESCRIPTION

Implementations of the present disclosure involve an apparatus, system and/or method for simulating and testing a failover, takeover or other events that occur in a cluster of network storage devices by using a simulated storage device to simulate the actions of a cluster. A simulated cluster may be created using a simulated storage appliance while still allowing for traditional testing methodologies and tools to be used that would conventionally apply to an actual storage cluster with a pair of storage appliances. This includes using the same testing drivers and the same I/O tests operating on clients that are used in an actual cluster. A simulation interface may be employed to receive test verbs sent by a test driver and perform any necessary actions that may be required to simulate the performance of certain actions that the simulated storage appliance is not capable of providing. The simulation interface may include an abstraction layer configured to receive verbs from the test driver and divide the commands between an AK plugin for conducting operations and otherwise interacting with the actual storage appliance and cluster, and a synthetic plugin for conducting operations or otherwise interacting with the simulated appliance and cluster.

Figure 1:
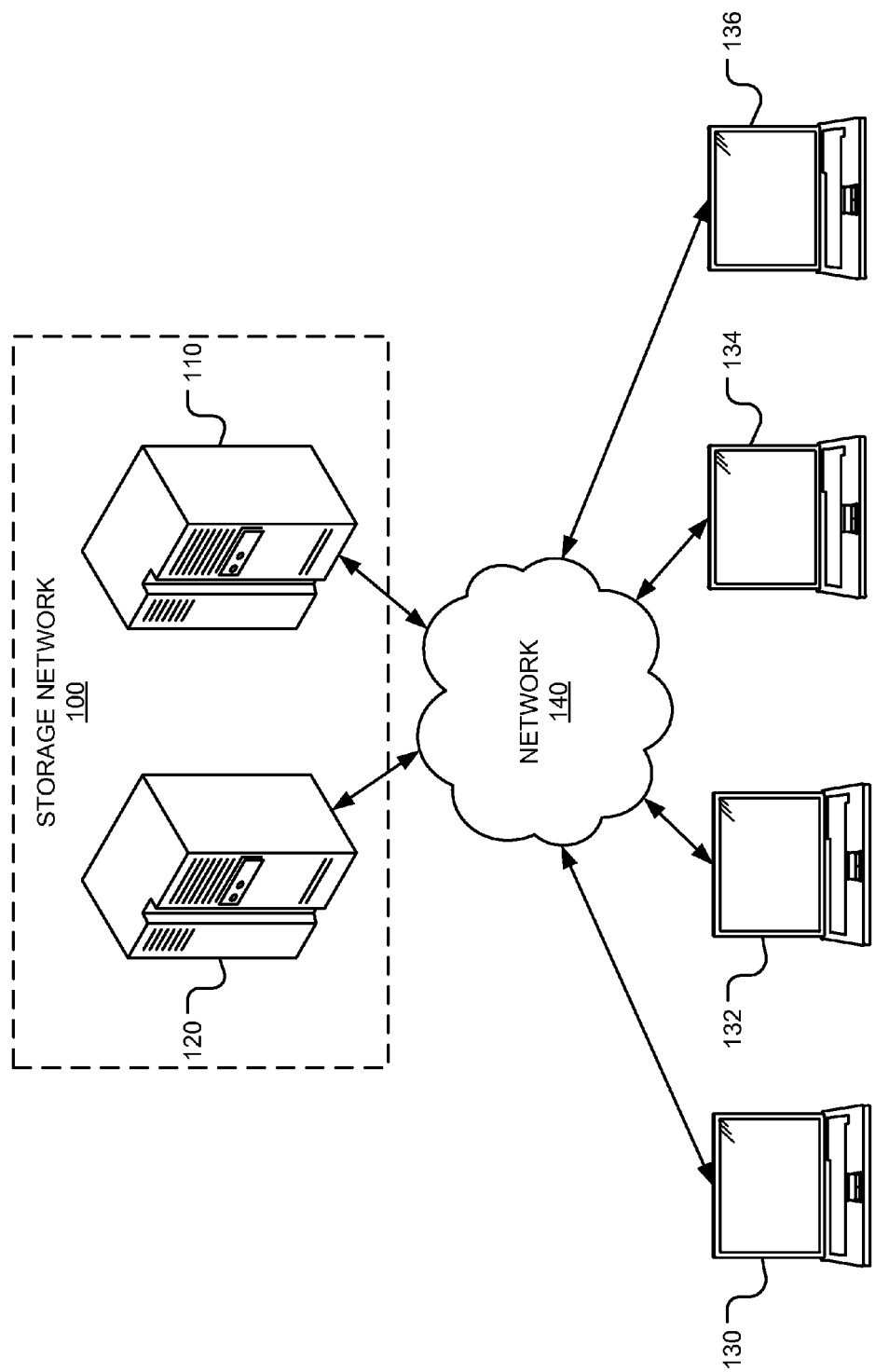
FIG. 1 is a block diagram illustrating an example of a data storage system.
Figure 2A:
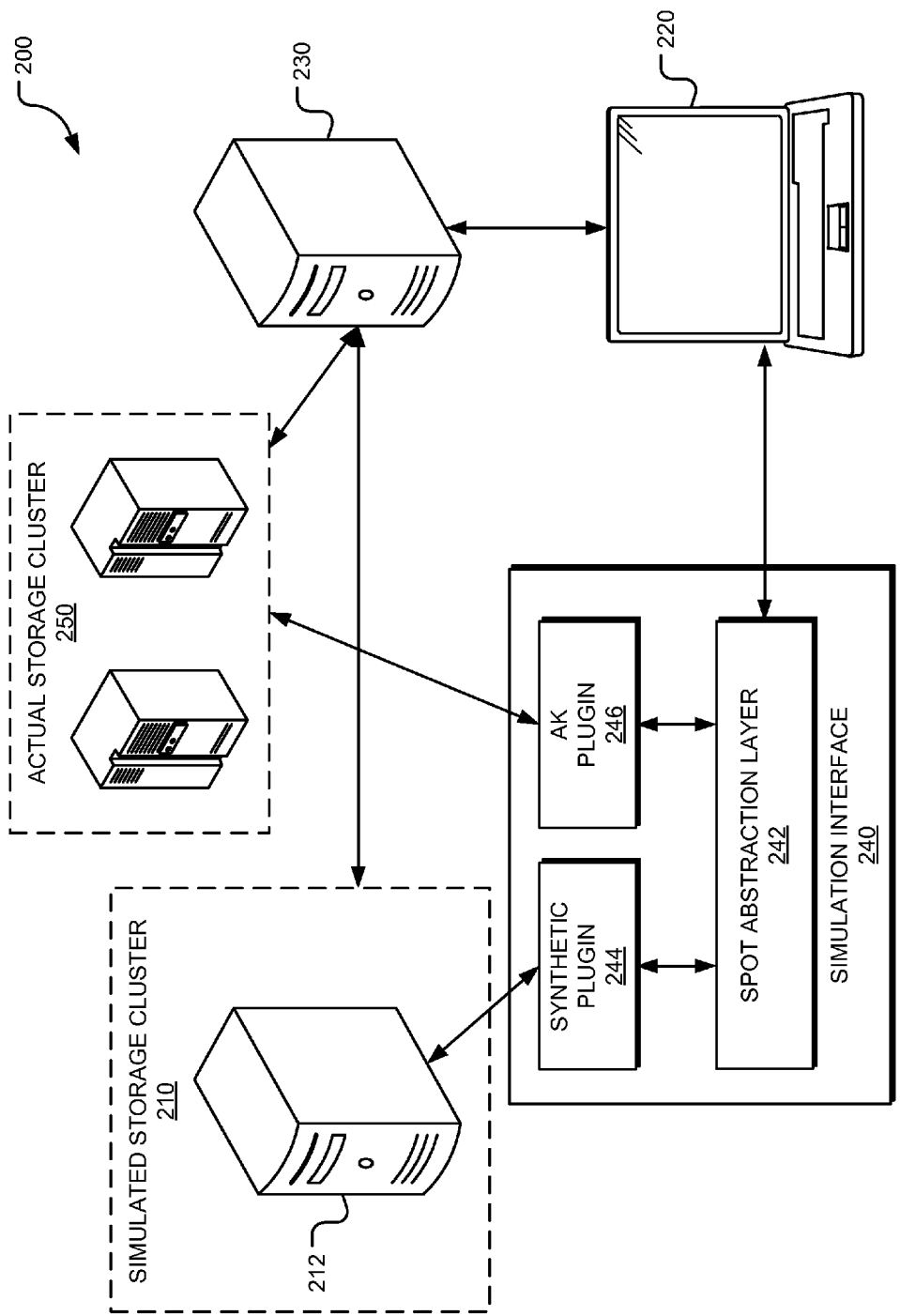
FIG. 2A is a block diagram illustrating an example of a system for simulating storage cluster for testing.

Referring now to FIG. 2A, an example of a system for simulating a storage cluster for testing 200 is depicted. In this example, the system 200 may include a simulated storage cluster 210 including a simulated storage appliance 212. Notably, the cluster is simulated with a single device in place of a pair of storage appliances. The simulated storage appliance 212 may include any conventional personal computer or server, although it is also possible to use an actual storage appliance to simulate the cluster of appliances. Testing of the storage cluster may be initiated by a test driver 220 that is configured to direct test cases operating on one or more test clients 230 and initiate events on the simulated storage cluster 210 using a simulation interface 240. In one example, the test driver 220 and the clients 230 may be the same test driver and clients used for non-simulated cluster testing and both the test driver 220 and the clients 230 are not required to have any knowledge that the simulated storage cluster 210 includes the simulated storage appliance 212.

The simulated storage cluster 210 operates such that various clients 230 may perform normal I/O operations such as opening files, downloading files, writing files, and locking files without any knowledge that the simulated storage cluster 210 only includes the simulated storage appliance 212 instead of two actual storage appliances. To a client, the simulated cluster 210 performs in relatively the same manner as an actual cluster, except the simulated storage appliance 212 may not have the same performance characteristics than an actual storage appliance (e.g. the inexpensive simulated storage appliance 212 may not be able to support as many connections, as high of I/O speeds, or as much storage space as a real storage appliance). Nonetheless, in certain implementations, the clients 230 are configured to perform functional verification tests so the performance of the simulated storage appliance 212 relevant to an actual appliance does not harm the results of the test.

More specifically, the simulated storage appliance 212 may include any computing device that can operate as a network attached storage (NAS) device operating using NFS and able to mount persistent storage and process I/O from one or more clients 230. For example, the simulated storage appliance 212 may include a traditional x86 server that is capable of mounting a zpool and performing I/O related to functioning as a NAS. In one specific implementation, the simulated storage appliance need only be a computing device able to operate using Oracle® Solaris® and NFSv4. The simulated storage appliance 212 may also include a virtual machine operating on a server. In other words, the simulated storage appliance 212 is not required to be particularly high performance and may be considerably cheaper in cost than an actual storage appliance, but is still able to allow clients 230 to connect and perform I/O. Furthermore, the simulated storage appliance 212 is not required to have clustering software or any specialized hardware to support clustering.

The test driver 220 is configured to communicate with the simulated storage cluster 210 and with each of the simulated appliance 212 or an actual storage appliance. The test driver 220 may include any computing device capable of connecting to the simulated storage cluster 210. For example, the test driver may include a conventional personal computer, server, or other computing device connected to the simulated storage cluster 210 and the client 230. The test driver 220 may be used to initiate testing of the simulated storage cluster 210.

The testing system 200 may also include one or more clients 230 for running test cases that drive and evaluate input/output (I/O) from the storage cluster 210. The clients 230 may include any computing devices capable of sending and requesting data to and from the storage cluster 210. The clients 230 may include one or more personal computers, servers, tablet computers, smart phones, mainframes, or any other network enabled computing device.

A user may initiate a test, such as unit test or a regression test, by logging on to the testing system and activating the test driver 220 using a conventional command line interface or graphical user interface (GUI). The test may be directed towards testing the software running on the simulated storage cluster 210, and may be configured to test various I/O operations, file operations, and otherwise. Besides testing software on the simulated cluster 210, the system is also able to run tests on an actual cluster. In order to run tests on both simulated and actual cluster, a simulation interface 240 may be used. The simulation interface 240 may include an Appliance Kit (AK) plugin 246 to initiate events on a conventional non-simulated storage cluster 250 and a synthetic plugin 244 to initiate events on the simulated storage cluster 210.

The simulation interface 240 allows for the test driver 220 to follow its normal testing procedure on the simulated storage cluster 210 as well as the actual cluster. Thus, besides incorporating the AK plugin 246 into the simulation interface 240 to allow for communication with the actual storage appliances 212, a synthetic plugin 244 and abstraction layer 242 are also provided in the simulation interface to facilitate communication between the test driver and the simulated cluster in a way that is not visible to the test driver. Stated differently, the test driver may interact with the simulated cluster in the same way it interacts with the actual cluster. The simulation interface 240 is configured to receive verbs from the test driver 220 and send the verb to either the AK plugin 246 or the synthetic plugin 244 depending on whether the cluster connected with the testing platform is a simulated cluster or an actual cluster.

The AK plugin 246 may be configured to converts verbs issued on the test driver 220 into commands that the actual storage cluster 250 understands. This may be done using a conventional network connection. In one example, the AK plugin 246 maps the verbs to the ZFSSA command line interface which may be invoked by a secure shell (SSH) command.

The synthetic plugin 244 may be configured to converts verbs issued on the test driver 220 into commands that the simulated storage cluster 210 understands. This may also be done using a conventional network connection. In one example, the synthetic plugin 244 maps the verbs to a series of commands that may be entered into a command line interface of the simulated storage appliance 212 invoked by a secure shell (SSH) command. The set of commands may be selected so that the simulated storage cluster 210 behaves similar to an actual storage cluster 250. The system thereby allows a user to initiate the same tests used on the actual cluster 250 in the same way that she initiates tests on the simulated cluster 210.

The test driver 220 may also allow a user to manually and/or directly cause operations to be performed on the actual storage cluster 250 by sending verbs to the storage cluster via the AK plugin 246, by initiating I/O test cases from the clients 230, or by both. The test driver 220 may also be configured to allow the user initiating an automated testing procedure to invoke one or more programs or scripts that activate test cases on the clients 230. The activated client test cases initiate operations on either the simulated appliance 212 or an actual storage appliance in a manner designed to test the various functionalities of an actual storage cluster. For example, the test driver 220 may include one or more scripts tailored for the software environments being used and are designed to automate the execution of various tests.

The testing procedure may be configured to control the occurrence of various events on the actual or simulated storage cluster in order to test the functionality of the software running on the cluster and use I/O test cases to verify the ability of the actual or simulated storage cluster to handle the event. For example, in the case of a failover, a non-failing node should takeover the resources and responsibilities of a failing node. The testing procedure may be used to initiate the failover/takeover event by sending a failover/takeover verb to the simulation interface 240 and at the same time start test cases on the clients 230 that test whether a successful failover/takeover or specific aspect of a failover/takeover occurred.

For example, once a testing procedure has been started, the client 230 (or clients) may begin running I/O test cases on the simulated cluster 210. These test cases may include functions for driving and testing I/O to and from the simulated storage cluster 210. For example, various test cases may involve requesting information regarding data stored on the simulated storage cluster 210, downloading files from the simulated storage cluster 210, writing files to the simulated storage cluster 210, opening files on the simulated storage cluster 210, locking files on the simulated storage cluster 210, waiting for certain status to be sent by the simulated storage cluster 210, or performing any other I/O operations of the simulated storage cluster 210. Thus, some test cases involve I/O operations at the cluster by a client. In such instances, the test case is both interacting with the simulated cluster as well as coordinating operations on the simulated cluster by the client. The test cases may use a variety of methods for driving I/O to and from the simulated storage cluster 210. For example, the test cases may involve operating system requests such as retrieving a file from the simulated storage cluster 210 or program requests such as downloading a file using an internet browser. In other words, the I/O test cases may be designed to simulate and test the normal operation on the simulated storage cluster 210, even though the cluster is simulated through the use of a simulated storage appliance 212, as viewed by the clients 230.

The test cases may also monitor the status of the various requests that have sent to the simulated storage cluster 210. For example, the test cases may monitor and log the success or failure of some or all requests, the speed at which requests are fulfilled, or any other functionality metrics relating to the I/O being driven and the test case being performed. Each test case may have various parameters for determining whether the test case passed or failed. For example, the results of each I/O test case may be compared to some metric or threshold and a determination of success or failure may be made. This may include comparisons such as whether the operation fails or doesn't meet a performance criterion such as a time limit. Furthermore, the clients 230 may operate with no knowledge of the simulated storage cluster 210 itself outside of the IP address of the cluster node, and or individual storage device (212) node that the client is accessing. The client 230 is simply making requests to a storage appliance, in this case the simulated storage appliance 212.

Figure 2B:
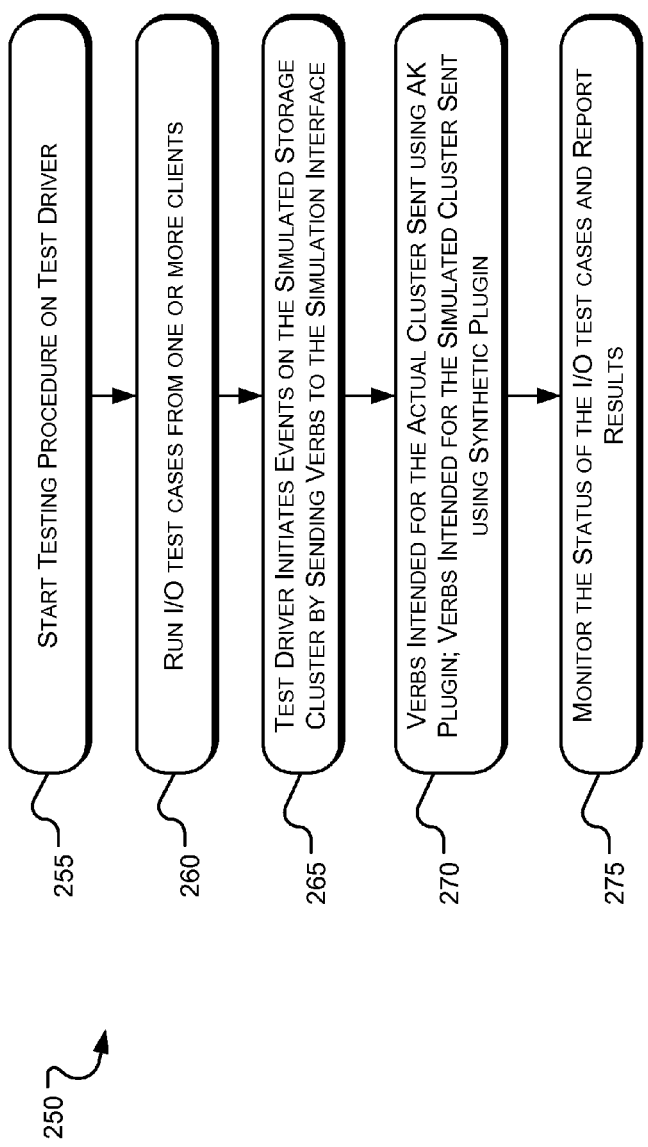
FIG. 2B is a flow diagram illustrating an example of a method for testing a simulated storage cluster.

Referring now to FIG. 2B, and also referencing FIG. 2A, a method 250 for testing various operations on a simulated cluster is depicted. To begin, a user may initiate a testing procedure on the test driver 220 (operation 255). For example, a user may initiate the testing procedure using a graphical user interface (GUI) or command line interface on a workstation that includes the test driver 220. The test driver 220 may then initiate the relevant I/O operations on the clients 230 (operation 260) as well as send verbs to instigate events on the simulated storage cluster 210 using the simulation interface 240 (operation 265). The simulation interface 240 identifies the type of storage cluster being used at the abstraction layer 242 and forwards the verb to the appropriate plugin accordingly. For example, if the cluster is an actual cluster, the verb may be sent to the AK plugin 246, which in turn, maps the verb to the appropriate ZFSSA command line interface command and sends the command to the actual storage cluster. If the abstraction layer 242 identifies that a simulated storage cluster 210 is being used, the verb may be sent to the synthetic plugin 244 (operation 270). The synthetic plugin 244, in turn, may map the verb to the appropriate Solaris® command line interface command or series of commands that are necessary to simulate the action or actions of an actual cluster.

Since a single simulated device is acting in place of a clustered pair of devices there are instances where the described testing system simulates the coordinated events on a conventional pair of actual devices. For example, a verb may invoke a single node or a cluster operation that requires actions to take place on both nodes with status updates or flags to be passed to connected clients. Since there are not two actual nodes, the simulated storage cluster 210 lacks the inherent ability to perform the operation associated with the verb. In one specific example, a verb may require or otherwise invoke cross node communications and certain status updates or flags to be sent to clients. For example, during a failover from node 0 to node 1, the failing node may inform the other node of the failover and various messages may need to be sent between the nodes and to the clients of the failing node. In the case of the simulated storage cluster 210, the synthetic plugin 244 may be configured to simulate the simulated storage appliance 212 to perform an action that gives the appearance of any expected operations without using any cross-node communications or communications from a second node.

In the specific case of simulated a failover on the simulated storage appliance 212, the abstraction layer identifies the failover verb and sends the verb to the synthetic plugin 244. In an actual storage cluster, a failover is accompanied by a sequence of events for transferring the operations of a failing storage appliance to another storage appliance, including, for example, mapping the storage pools and IP address of the failing cluster to the taking over cluster. However, the simulated device is incapable of performing these events so they are simulated. To begin, for example, the test driver 220 may send a verb corresponding to a failover/takeover to the simulation interface 240. The abstraction layer 242 receives the failover/takeover verb and forwards it to the synthetic 244 plugin since a simulated storage cluster 210 is being used. The synthetic plugin 244 may send one or more commands understood by the simulated storage appliance 212 performing a failover/takeover. For example, the one or more commands may include corresponding to dismounting a zpool connected to the simulated storage appliance 212, followed by a command to reboot the nfs server daemon on the simulated storage appliance 212, followed by a command for the simulated appliance 212 to remount the zpool once the NFS server daemon has finished rebooting. The result is that although the simulated storage appliance 212 cannot perform an actual failover, the simulated storage appliance 212 is sequenced through a series of events, such as informing the clients of a server failure, requesting the clients provide state information, and making the clients wait a grace period, so that the NFS software related to taking over another node is still able to be tested using the simulated storage appliance 212. The synthetic plugin 244 may be capable of performing any necessary operations in order to allow for the simulation of the storage cluster 210. For example, the synthetic plugin 244 may be configured to start one or more processes, restart processes, kill processes, mount and dismount storage pools, shutdown nodes as a whole, or invoke any other relevant command to the simulated appliance 212. In some cases, the synthetic plugin 244 may be configured to restart the NFS server daemon (nfsd) with different options and properties that effectively duplicate the operations that happen on an actual appliance performing the operation associated with the verb.

As the testing driver 220 proceeds through the testing procedure, the status of the various I/O test cases may be monitored by the clients 230 or the test driver 220. After the testing procedure has been completed the results of the tests may be reported.

Figure 3A:
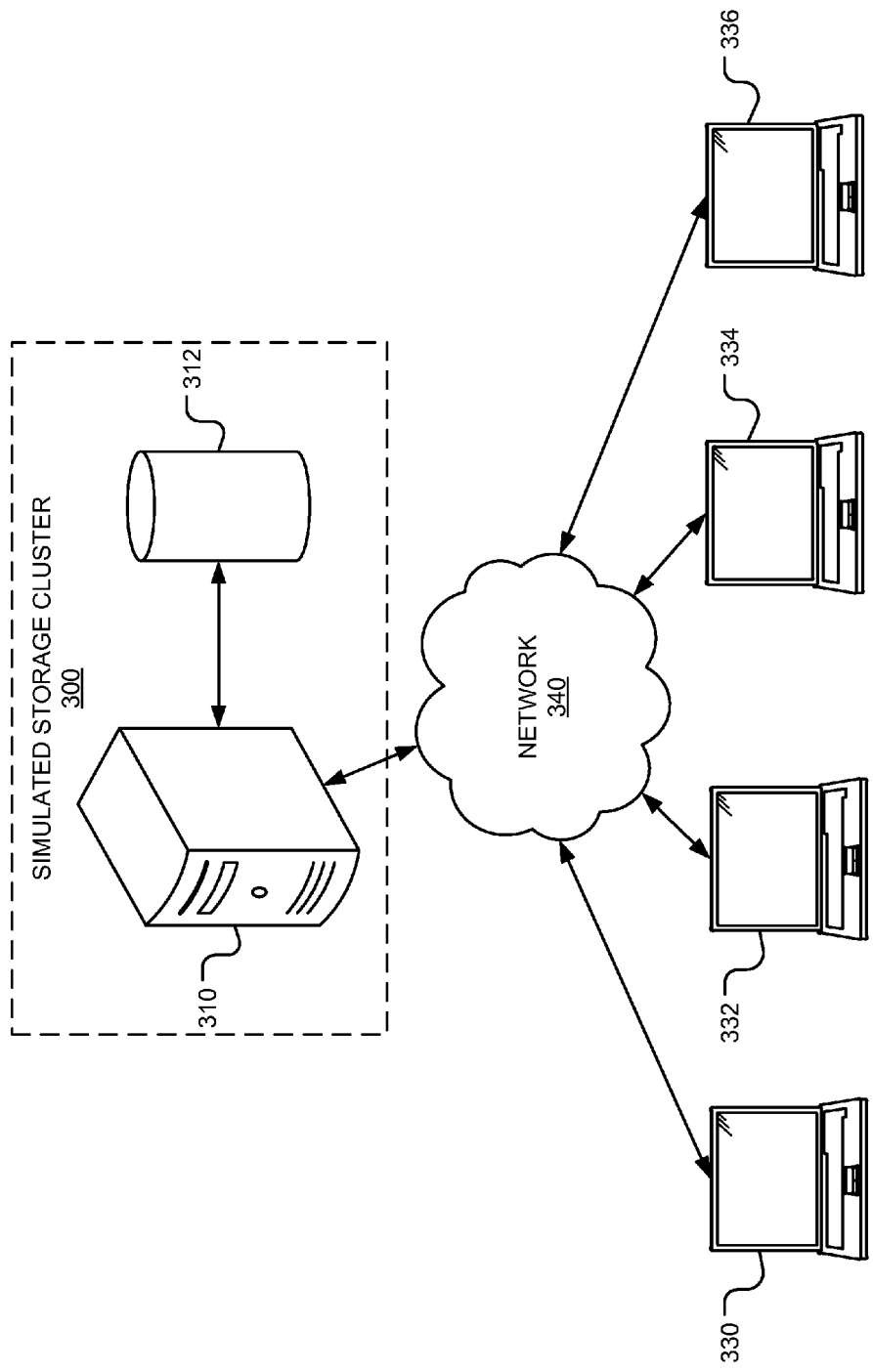
FIGS. 3A and 3B are block diagrams illustrating a simulated storage system performing a failover/takeover.
Figure 3B:
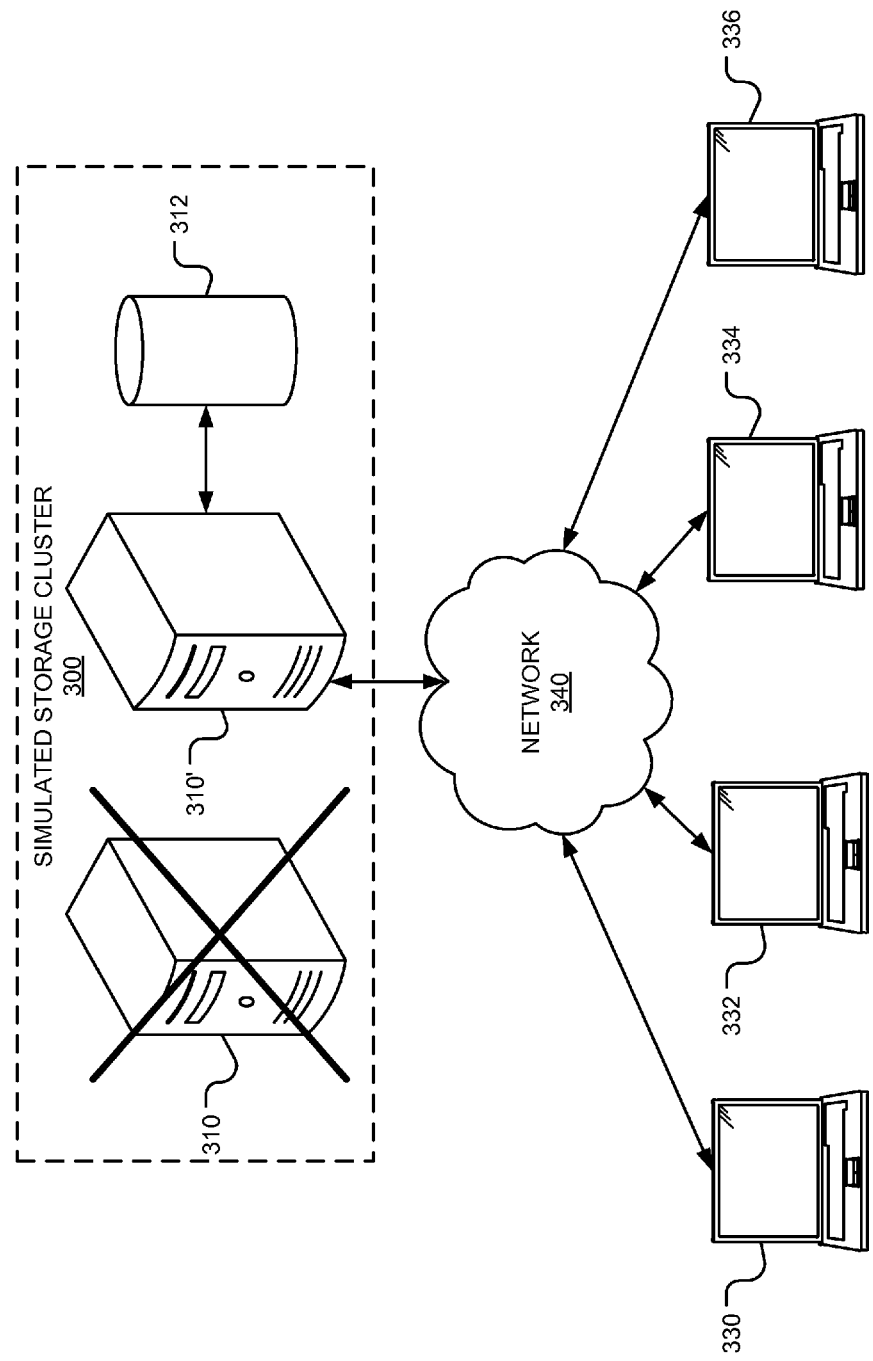

Referring to FIGS. 3A and 3B, an example of a simulated storage cluster 300 that experiences a failover or takeover is depicted, which is one of the operational sequences of a cluster that may tested. Hence, the following discussion further expands on the example of simulated a failover event in a cluster. In this example, a simulate storage appliance 310 is configured to direct data to and from a persistent memory 312. In the event of a takeover, reboot, or the like, one of the storage appliances in an actual storage cluster takes over operation for the other storage appliance until the storage appliance returns to normal operation. In the case of the simulated storage cluster 300, there is no storage appliance there to take over the operations of the simulated storage appliance 310. In this example, the simulated storage appliance 310 is configured to operate according using NFSv4 and may be connected to the network 340 using any type of network connection the simulated storage appliance 310 may have one or more Internet protocol (IP) addresses. The IP address provides the simulated storage appliance 310 with a location that may be used by clients 330-336 to connect and communicate with the simulated storage appliance 310 to access the persistent memory 312. In a conventional cluster, one or more clients 330, 332, 334, 336 may have a need for data that is stored on one of the persistent memories 312 attached to one of the storage appliances. The clients 330-336 may connect to the storage appliances using the network 340 and the storage appliance's IP address to request the data. In the case of a failover or takeover the storage appliance that is still active facilitates the transfer of the data from the corresponding persistent memory to the requesting client. This may include the storage appliances taking temporary ownership of the other storage appliance's persistent memory and providing input/output functionality until the other appliance can resume its duties. For example, in the case where the an actual storage appliance or the simulated storage appliance 310 operate using Oracle® ZFS™ and NFSv4 the metadata may include location information such as which zpool and virtual device the data is located on, as well as any other information regarding the location of the data.

FIG. 3B illustrates the simulated storage cluster 300 after the occurrence of the simulated takeover or failover. In this example, the simulated storage appliance 310 must appear to conduct a failover or takeover (e.g. the client operations are taken over by another storage appliance). Since there is only a single simulated storage appliance 310, in the process of a simulated failover/takeover, the NFSD of the simulated storage appliance 310 was rebooted with different operating characteristics, giving it the appearance of a failover/takeover taking place with the a second node 310' taking over the responsibilities of the simulated storage appliance 310. During a failback the services taken over by a storage appliance along with the storage appliance's persistent memory and IP address are transferred back to the re-operational storage appliance and the operations of the clients 330-336 are again directed to back to the storage appliance. In order to simulate the occurrence of the failback, the NFSD may again be rebooted with the options and properties that reconnect the persistent storage 312 to the simulated storage appliance 310. To the clients 330-336, through the course of the simulated takeover/failback it appears that they have been transferred to a different storage appliance 310' and back to the simulated storage appliance 310.

Persistent memory 312 is in communication with the simulated storage appliance 310. In the storage system illustrated in FIGS. 3A and 3B, the persistent memory 312 may include any persistent type of memory such as a conventional spinning disk hard drive, a solid state hard drive or a magnetic tape drive with magnetic tapes. As used herein, the term "persistent memory" refers to a device whose contents are persevered despite a loss of power.

Figure 4:
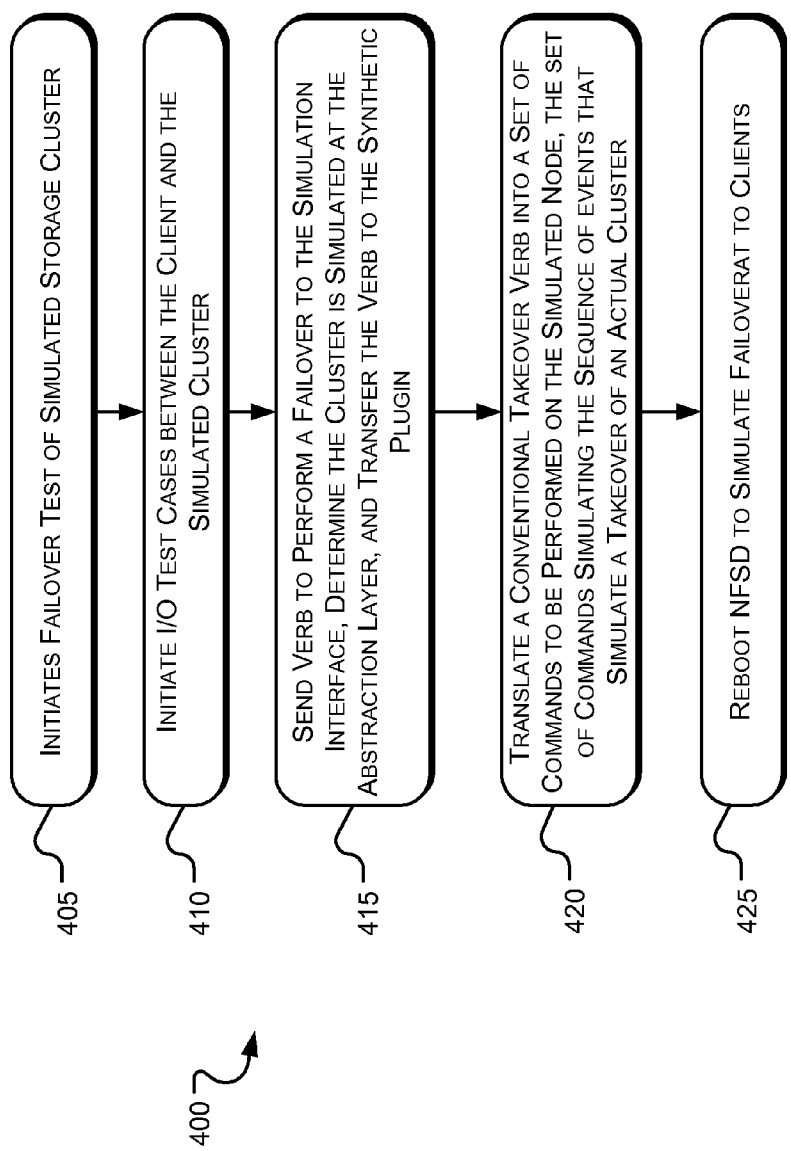
FIG. 4 is a block diagram illustrating a method for simulating a Failover/Takeover on a simulated storage system.

Referring to FIG. 4, an example of method 400 of simulating a failover/takeover and a failback using the simulated storage system 200 is depicted. In this example, the test driver 220 may institute a test of the takeover functionality on the simulated storage cluster 210 (operation 405). The test driver 220 initiates the I/O test cases running between the clients 230 and the simulated storage cluster 210 (operation 410). The test cases may be specially configured to test the input/output capability of a storage cluster during the event of a takeover, include general purpose test cases designed to simply drive I/O, or both. After the initiation of the test cases, the test driver 220 may send a verb to the simulation interface 240 to initiate a takeover of node 0 by node 1. In this example, node 0 and node 1 may both be simulated by the simulated storage appliance 212. The verb for node 1 to takeover node 0, for example "takeover0," is sent to the abstraction layer 242. Upon receipt of the verb, the abstraction layer may first determine whether the storage cluster is a simulated storage cluster. Since in this example, the cluster is the simulated storage cluster 210, the abstraction layer may send the verb to a synthetic plugin 244 corresponding to a takeover of a simulated storage appliance 212 (operation 415). Once the synthetic plugin 244 receives the verb, the synthetic plugin 244 may translate the verb into a list of commands that need to be performed and status that need to be shown to simulate the occurrence of a takeover/failover (operation 420). In this example, since the simulated storage appliance 212 does not include clustering software or hardware that is found in an actual storage appliance, the IP address and storage pools of the simulated storage appliance 212 cannot be transferred to another node as in a normal storage cluster. For example, in an NFSv4 based storage cluster, the synthetic plugin 244 may be configured to make it appear that the IP address and the storage pools are assigned from node 0 to node 1 in the simulated storage cluster 200 even though there are not really discreet nodes 0 and 1. As described above, this may be done by restarting the NFSD with the appropriate options so that it appears to the clients 230 that a takeover has occurred. Rebooting the NFSD may the simulated storage appliance 212 to show error messages and later request state information in the same manner as a failing node and a taking over node (operation 430). After the completion of the failover/takeover, the test driver 220 may then move onto the next tests in the testing procedure. A failback may then be simulated using a similar method.

Figure 5:
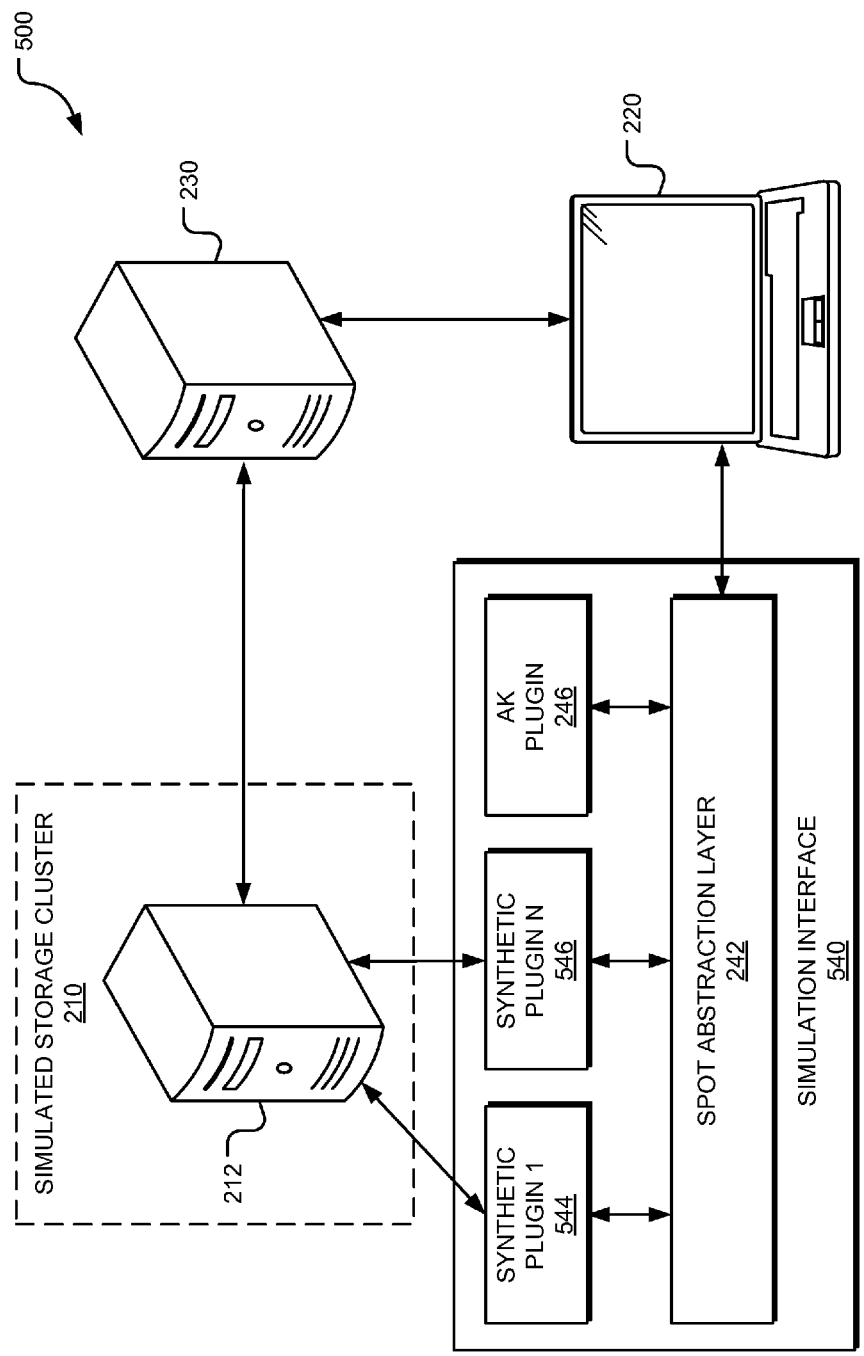
FIG. 5 is a block diagram illustrating an example of a system for simulating storage cluster testing while using a plurality of synthetic plugins that may cover a variety of platforms.

Referring now to FIG. 5, another example of a system for simulating a storage cluster for testing 500 is depicted. In this example, the simulation interface 540 may include multiple synthetic plugins 544, 546. This plurality of synthetic plugins 544, 546 may be utilized to allow for additional tests as well as for different simulated appliance platforms to be used. By adding additional synthetic plugins 544, 546 to cover more tests and platforms, more common test cases will be able to be used, utilizing a variety of platforms.

Figure 6:
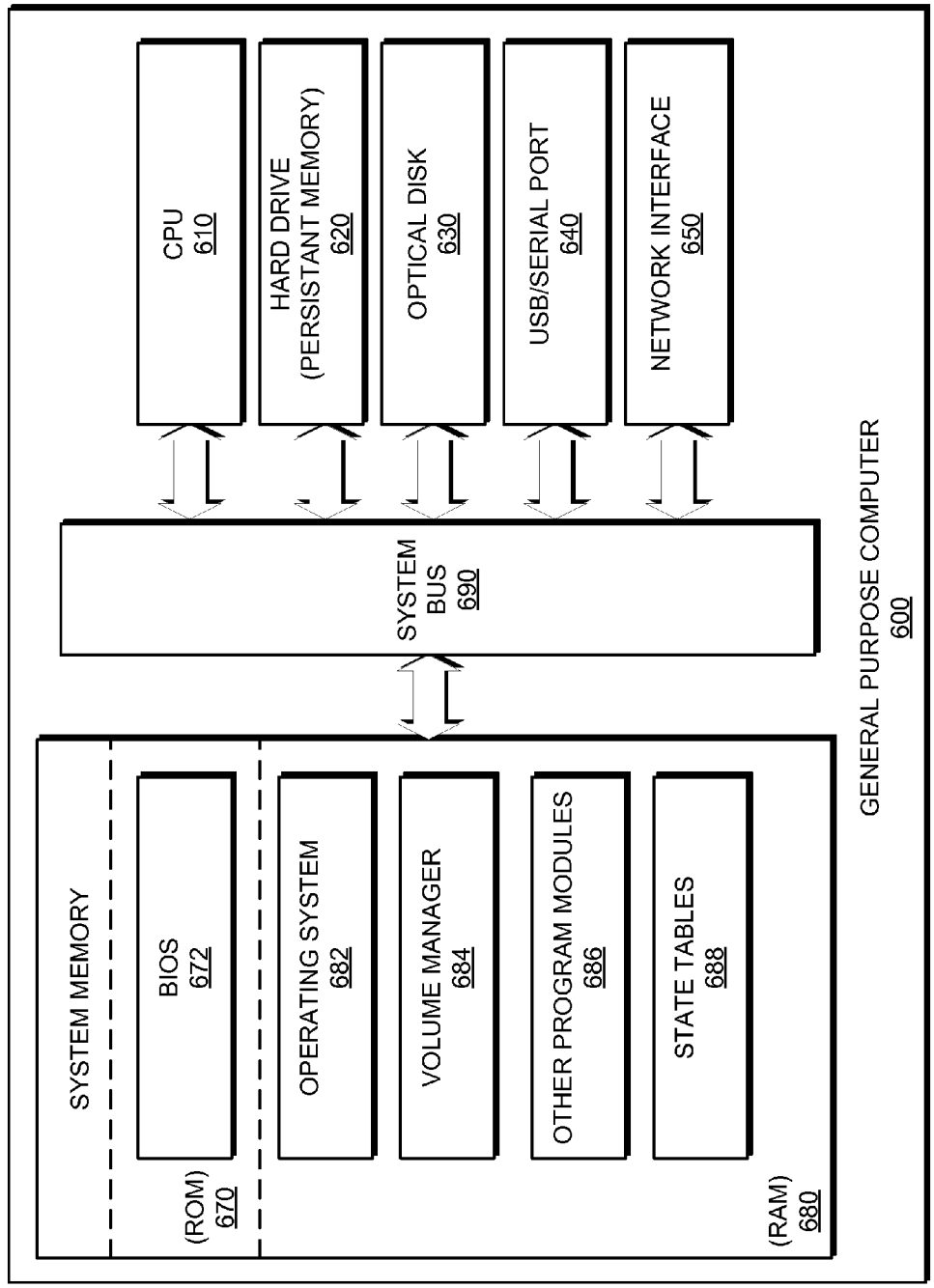
FIG. 6 is a block diagram illustrating an example of a general purpose computing system that may be used in the application of the present disclosure.

FIG. 6 illustrates an example general purpose computer 600 that may be useful in implementing the described technology. The example hardware and operating environment of FIG. 6 for implementing the described technology includes a computing device, such as general purpose computing device in the form of a personal computer, server, or other type of computing device. In the implementation of FIG. 6, for example, the simulated storage appliance 212, 310 includes a processor 610, a system memory 670, 680, and a system bus 690 that operatively couples various system components including the system memory 670, 680 to the processor 610. There may be only one or there may be more than one processor 610, such that the processor of simulated storage appliance 212 comprises a single central processing unit (CPU), or a plurality of processing units, commonly referred to as a parallel processing environment. The simulated storage appliance 212 may be a conventional computer, a distributed computer, or any other type of computer; the invention is not so limited.

The system bus 690 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 670 and random access memory (RAM) 680. A basic input/output system (BIOS) 672, containing the basic routines that help to transfer information between elements within the simulated storage appliance 212, 310, such as during start-up, is stored in ROM 670. The simulated storage appliance 212, 310 further includes a hard disk drive 620 for reading from and writing to a persistent memory such as a hard disk, not shown and an optical disk drive 630 for reading from or writing to a removable optical disk such as a CD ROM, DVD, or other optical media.

The hard disk drive 620 and optical disk drive 630 are connected to the system bus 690. The drives and their associated computer-readable media provide nonvolatile storage of computer-readable instructions, data structures, program engines and other data for the simulated storage appliance 212, 310. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program engines may be stored on the hard disk, optical disk, ROM 670, or RAM 680, including an operating system 682, a NFS client 684, one or more application programs 686, and program data such as state tables 688. A user may enter commands and information into the storage appliance 212, 310 through input devices such as a keyboard and pointing device connected to the USB or Serial Port 640. These and other input devices are often connected to the processor 610 through the USB or serial port interface 640 that is coupled to the system bus 690, but may be connected by other interfaces, such as a parallel port. A monitor or other type of display device may also be connected to the system bus 690 via an interface, such as a video adapter 660. In addition to the monitor, computers typically include other peripheral output devices (not shown), such as speakers and printers.

The storage appliance 212, 310 may operate in a networked environment using logical connections to one or more remote computers. These logical connections are achieved by a network interface 650 coupled to or a part of the storage appliance 212, 310; the invention is not limited to a particular type of communications device. The remote computer may be another computer, a server, a router, a network PC, a client, a peer device, a network storage appliance such as a ZFS storage appliance, or other common network node, and typically includes many or all of the elements described above relative to the storage appliance 212, 310. The logical connections include a local-area network (LAN) a wide-area network (WAN), or any other network. Such networking environments are commonplace in office networks, enterprise-wide computer networks, intranets and the Internet, which are all types of networks.

The network adapter 650, which may be internal or external, is connected to the system bus 550. In a networked environment, programs depicted relative to the storage appliance 212, 310, or portions thereof, may be stored in the remote memory storage device. It is appreciated that the network connections shown are example and other means of and communications devices for establishing a communications link between the computers may be used.

The embodiments of the invention described herein are implemented as logical steps in one or more computer systems. The logical operations of the present invention are implemented (1) as a sequence of processor-implemented steps executing in one or more computer systems and (2) as interconnected machine or circuit engines within one or more computer systems. The implementation is a matter of choice, dependent on the performance requirements of the computer system implementing the invention. Accordingly, the logical operations making up the embodiments of the invention described herein are referred to variously as operations, steps, objects, or engines. Furthermore, it should be understood that logical operations may be performed in any order, unless explicitly claimed otherwise or a specific order is inherently necessitated by the claim language.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. A computer for testing a simulated storage cluster testing system comprising:
a processor coupled with a memory, wherein the processor is configured to execute instructions stored in the memory to produce a simulation interface, the instructions for producing a simulation interface comprising:
an abstraction layer configured to receive a verb and pass the verb to at least one plugin comprising a synthetic plugin configured to translate the verb into at least one command and send the at least one command to a simulated storage appliance, the simulated storage appliance being a computing device operating as a storage server with at least one storage pool, the simulated storage appliance acting in place of a first actual storage appliance and a second actual storage appliance clustered to form an actual storage cluster, the simulated storage appliance forming a simulated storage cluster, wherein the at least one command corresponds to simulating the verb being performed by the actual storage cluster.

2. The computer of claim 1, wherein the simulation interface further comprises an appliance kit plugin configured to translate the verb into a command and send the command to the first storage actual appliance, the command invoking an operation on the first actual storage appliance.

3. The computer of claim 1, wherein the verb is received at the abstraction layer from a test driver, the test driver transmitting the verb in accordance with a testing procedure of the actual storage cluster.

4. The computer of claim 3, wherein the test driver is further configured to initiate one or more I/O operations between a client and the simulated storage cluster.

5. The computer of claim 4, wherein the synthetic plugin is further configured to send an expected status to the client that is in communication with the simulated storage cluster, the expected status corresponding to an expected status that would be sent if the verb had been sent to the actual storage cluster.

6. The computer of claim 1, wherein the simulated storage appliance is configured to operate using network file system (NFS).

7. The computer of claim 6, wherein the synthetic plugin comprises a failover/failback plugin configured to: reboot an NFS daemon of the simulated storage appliance in order to cause the NFS server to issue at least one notice to a client, wherein the at least one notice comprises a notice issued during at least one of a failover and a failback in the actual storage cluster.

8. The computer of claim 7, wherein the failover/failback plugin further configured to modify at least one NFS parameter to simulate at least one of a failover and a failback.

9. The computer of claim 1, wherein the computing device comprises a personal computer or server.

10. A simulated cluster testing system comprising:
a simulated storage appliance including at least one computing device comprising a processor coupled with a memory operating as a storage server with at least one storage pool, the simulated storage appliance acting in place of a first actual storage appliance and a second actual storage appliance clustered to form an actual storage cluster, the simulated storage appliance forming a simulated storage cluster;
at least one client in communication with the simulated storage cluster; and
a test driver operating on the at least one computing device, the test driver configured to:
transmit a verb to a simulation interface comprising a synthetic plugin configured to translate the verb into at least one command and send the at least one command to the simulated storage appliance, wherein the at least one command corresponds to simulating the verb being performed by the actual storage cluster.

11. The system of claim 10, wherein the simulation interface further comprises an appliance kit plugin configured to translate the verb into a command and send the command to the first actual storage appliance, the command invoking an operation on the first actual storage appliance.

12. The system of claim 10, wherein the simulation interface further comprises an abstraction layer, wherein the verb is received at the abstraction layer from the test driver, the test driver transmitting the verb in accordance with a testing procedure of the actual storage cluster.

13. The system of claim 10, wherein the test driver, is further configured to initiate one or more I/O operations between the at least one client and the simulated storage cluster.

14. The system of claim 13, wherein the synthetic plugin is further configured to send an expected status to the client that is in communication with the simulated storage cluster, the expected status corresponding to an expected status that would be sent if the verb had been sent to the actual storage cluster.

15. The system of claim 10, wherein the simulated storage appliance is configured to operate using network file system (NFS).

16. The system of claim 15, wherein the synthetic plugin comprises a failover/failback plugin configured to: reboot an NFS daemon of the simulated storage appliance in order to cause the NFS server to issue at least one notice to a client, wherein the at least one notice comprises a notice issued during at least one of a failover and a failback in the actual storage cluster.

17. The system of claim 16, wherein the failover/failback plugin further configured to modify at least one NFS parameter to simulate at least one of a failover and a failback.

18. The system of claim 10, wherein the at least one computing device comprises a personal computer or server.

19. A method for simulating a storage cluster comprising a simulated storage appliance, the method comprising:
   receiving a verb at an abstraction layer;
   passing the verb to at least one plugin comprising a synthetic plugin;
   translating the verb at the synthetic plugin into at least one command and sending the at least one command to a simulated storage appliance, the simulated storage appliance being a computing device operating as a storage server with at least one storage pool, the simulated storage appliance acting in place of a first actual storage appliance and a second actual storage appliance clustered to form an actual storage cluster, the simulated storage appliance forming a simulated storage cluster, wherein the at least one command corresponds to simulating the verb being performed by the actual storage cluster.

20. The method of claim 19, wherein the at least one plugin further comprises an appliance kit plugin configured to translate the verb into a command and send the command to the first actual storage appliance, the command invoking an operation on the first actual storage appliance.

21. The method of claim 19, wherein the simulation interface further comprises an abstraction layer, wherein the verb is received at the abstraction layer from the test driver, the test driver transmitting the verb in accordance with a testing procedure of the actual storage cluster.

22. The method of claim 19, further comprising initiating one or more I/O operations between a client and the simulated storage cluster.

23. The method of claim 22, wherein the synthetic plugin is further configured to send an expected status to the client that is in communication with the simulated storage cluster, the expected status corresponding to an expected status that would be sent if the verb had been sent to the actual storage cluster.

24. The method of claim 19, wherein the simulated storage appliance is configured to operate using network file system (NFS).

25. The method of claim 24, wherein the synthetic plugin comprises a failover/failback plugin configured to: reboot an NFS daemon of the simulated storage appliance in order to cause the NFS server to issue at least one notice to a client, wherein the at least one notice comprises a notice issued during at least one of a failover and a failback in the actual storage cluster.

26. The method of claim 25, wherein the failover/failback plugin further configured to modify at least one NFS parameter to simulate at least one of a failover and a failback.

27. The method of claim 19, wherein the computing device comprises a personal computer or server.

* * * * *